United States Patent
Sakurai

(10) Patent No.: US 8,208,757 B2
(45) Date of Patent: Jun. 26, 2012

(54) RECOGNITION SYSTEM, RECOGNITION METHOD, AND RECOGNITION PROGRAM

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 1093 days.

(21) Appl. No.: 12/092,025

(22) PCT Filed: May 15, 2007

(86) PCT No.: PCT/JP2007/060315
§ 371 (c)(1),
(2), (4) Date: Apr. 29, 2008

(87) PCT Pub. No.: WO2007/138898
PCT Pub. Date: Dec. 6, 2007

(65) Prior Publication Data
US 2009/0252420 A1    Oct. 8, 2009

(30) Foreign Application Priority Data

May 25, 2006    (JP) .................................. 2006-145274

(51) Int. Cl.
*G06K 9/62*    (2006.01)

(52) U.S. Cl. ...................................................... 382/281
(58) Field of Classification Search .................. None
See application file for complete search history.

(56) References Cited

U.S. PATENT DOCUMENTS
6,111,993 A * 8/2000 Matsunaga ................... 382/281

FOREIGN PATENT DOCUMENTS
| JP | 6-266828 A | 9/1994 |
| JP | 6-314339 A | 11/1994 |
| JP | 10-208056 A | 8/1998 |
| JP | 2003-271975 A | 9/2003 |

* cited by examiner

*Primary Examiner* — Brian P Werner
(74) *Attorney, Agent, or Firm* — Dickstein Shapiro LLP

(57) ABSTRACT

A recognition system of this invention has feature point detection means (120), Hough transform means (130), and specific pattern output means (140). In the Hough transform means (130), a Hough space is designed so that a magnitude relation of a distance between points in the Hough space is equivalent to a predetermined magnitude relation of an inter-specific-pattern distance indicative of a difference between specific patterns. The recognition system detects the specific patterns using the Hough space. By adopting such a structure to express more similar specific patterns in an image as closer points also in the Hough space, it is possible to achieve an object of this invention.

18 Claims, 12 Drawing Sheets

RECOGNITION SYSTEM, RECOGNITION METHOD, AND RECOGNITION PROGRAM

TECHNICAL FIELD

This invention relates to a recognition system, a recognition method, and a recognition program and, in particular, relates to a recognition system, a recognition method, and a recognition program that are strong against noise and are capable of preventing overdetection detecting, as a recognition object specific pattern, a partial region other than the recognition object specific pattern.

BACKGROUND ART

One example of conventional recognition systems is described in Japanese Unexamined Patent Application Publication (JP-A) No. Hei 6-314339 (Prior Art Document 1). This conventional recognition system detects a straight line as a specific pattern from an image as object data. The conventional recognition system can suppress a phenomenon that a false straight-line component appears around a true straight-line component, which has generally been a problem when using the Hough transform.

As shown in FIG. 1, this conventional recognition system comprises an image pickup section 31, an edge detecting section 32, a Hough transform processing section 33, a Hough space producing section 34, and a straight-line component extracting section 35.

The conventional recognition system having such a structure operates as follows.

That is, an image to be a recognition object is input from the image pickup section 31. Then, the image sent from the image pickup section 31 is differentiated by the edge detecting section 32, thereby edges of the image are detected. Then, a sequence of points representing each of the detected edges of the image are Hough-transformed by the Hough transform processing section 33. Then, a histogram according to Hough-transform function values (hereinafter this will be referred to as a Hough space) is produced by the Hough space producing section 34.

Finally, the straight-line component extracting section 35 detects frequency peak points in the Hough space, judges that the sequence of points of the edge of the image corresponding to Hough function curves passing through each of the detected peak points form a straight line, and extracts straight-line components from the image.

Herein, the operation of the straight-line component extracting section 35 will be described. The straight-line component extracting section 35 detects a maximum peak point in the Hough space produced by the Hough space producing section 34, extracts a straight-line component corresponding to the maximum peak point, and then derives a range and a contribution amount in which the maximum peak point exerts an influence on a frequency distribution of the histogram.

Then, according to the derived contribution amount in the above range, the straight-line component extracting section 35 corrects frequencies of the other peak points in the Hough space so as to suppress the influence of the maximum peak point.

Then, using the partially corrected Hough space, the straight-line component extracting section 35 detects the next larger peak point, extracts a straight-line component corresponding to that peak point, and subsequently performs the same processing in sequence.

DISCLOSURE OF THE INVENTION

Problem to be Solved by the Invention

A first problem is that, generally, when extracting a specific pattern like a straight line by the Hough transform, a false specific pattern appears around a true specific pattern.

The reason therefor is that a pattern that should primarily converge on one peak point disperses due to noise or the like.

A second problem is that a large processing amount is required for coping with the phenomenon that a false specific pattern appears around a true specific pattern, like in the foregoing conventional technique.

The reason therefor is that the conventional technique is configured such that every time one peak point is detected in a Hough space, an influence exerted on the other points in the Hough space by that peak point is removed from associated regions in the Hough space.

It is an object of this invention to provide a recognition system which is capable of easily performing reliable specific pattern detection.

Means for Solving the Problem

A recognition system according to a first mode of this invention comprises feature point detection means (120), Hough transform means (130), and specific pattern output means (140). In the Hough transform means (130), a Hough space is designed so that a magnitude relation of a distance between points in the Hough space is equivalent to a predetermined magnitude relation of an inter-specific-pattern distance indicative of a difference between specific patterns, and the specific patterns are detected using the Hough space. By adopting such a structure to express more similar specific patterns in an image as closer points also in the Hough space, it is possible to achieve the object of this invention.

Effect of the Invention

A first effect is that it is possible to suppress the phenomenon that a false specific pattern appears around a true specific pattern, which has generally been a problem when using the Hough transform.

The reason therefor is that a Hough space is designed so that a magnitude relation of a distance between points in the Hough space is equivalent to a predetermined magnitude relation of an inter-specific-pattern distance indicative of a difference between specific patterns, and thus, more similar specific patterns in an image are expressed as closer points also in the Hough space.

A second effect is that it is possible to easily realize suppression of appearance of the false specific pattern.

The reason therefor is that since more similar specific patterns in an image are expressed as closer points also in the Hough space, the suppression of appearance of the false specific pattern can be realized only by local processing in the Hough space or without performing the processing.

BEST MODE FOR CARRYING OUT THE INVENTION

Figure 1:
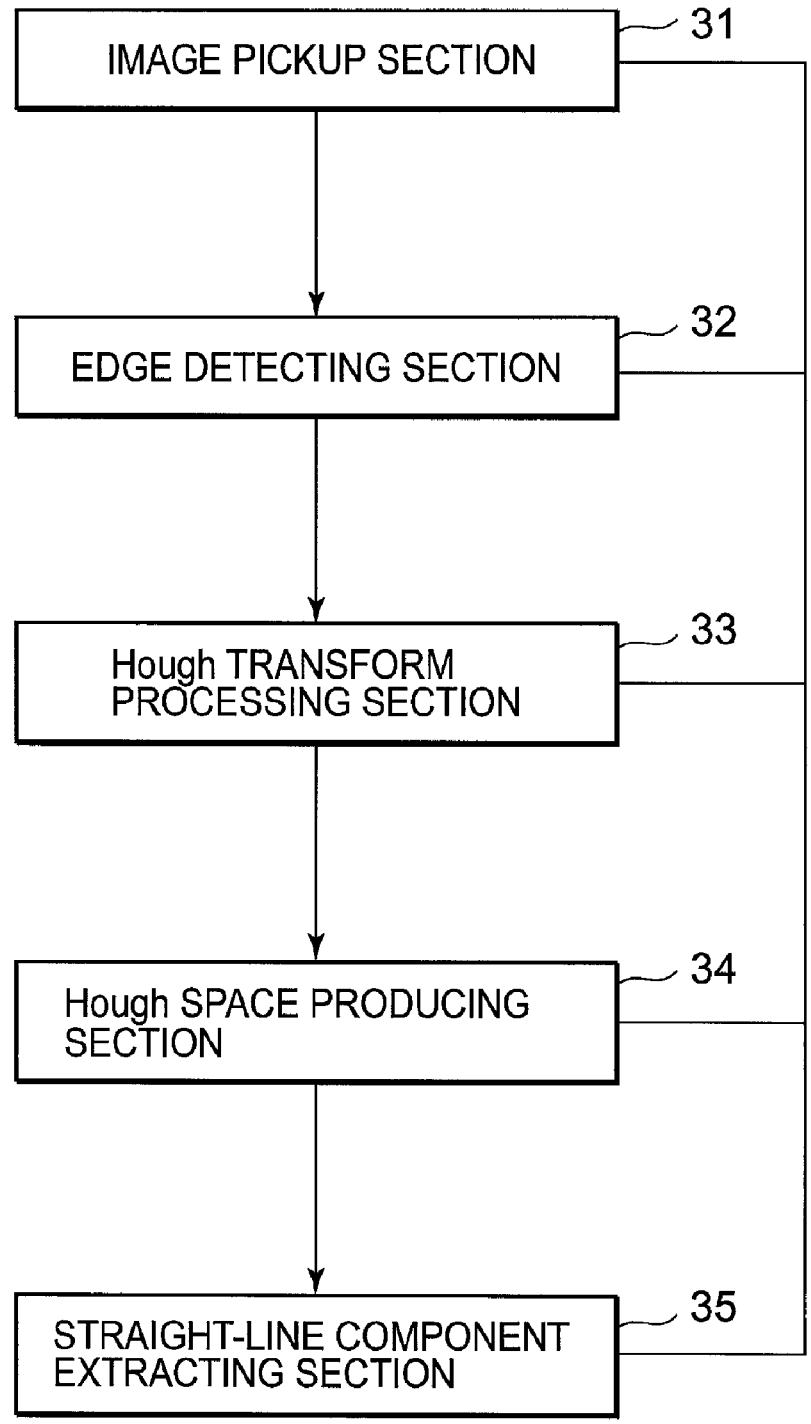
FIG. 1 is a block diagram showing the structure of a conventional technique.

Hereinbelow, referring to the drawings, a description will be given in detail of the best mode for carrying out this invention.

Figure 2:
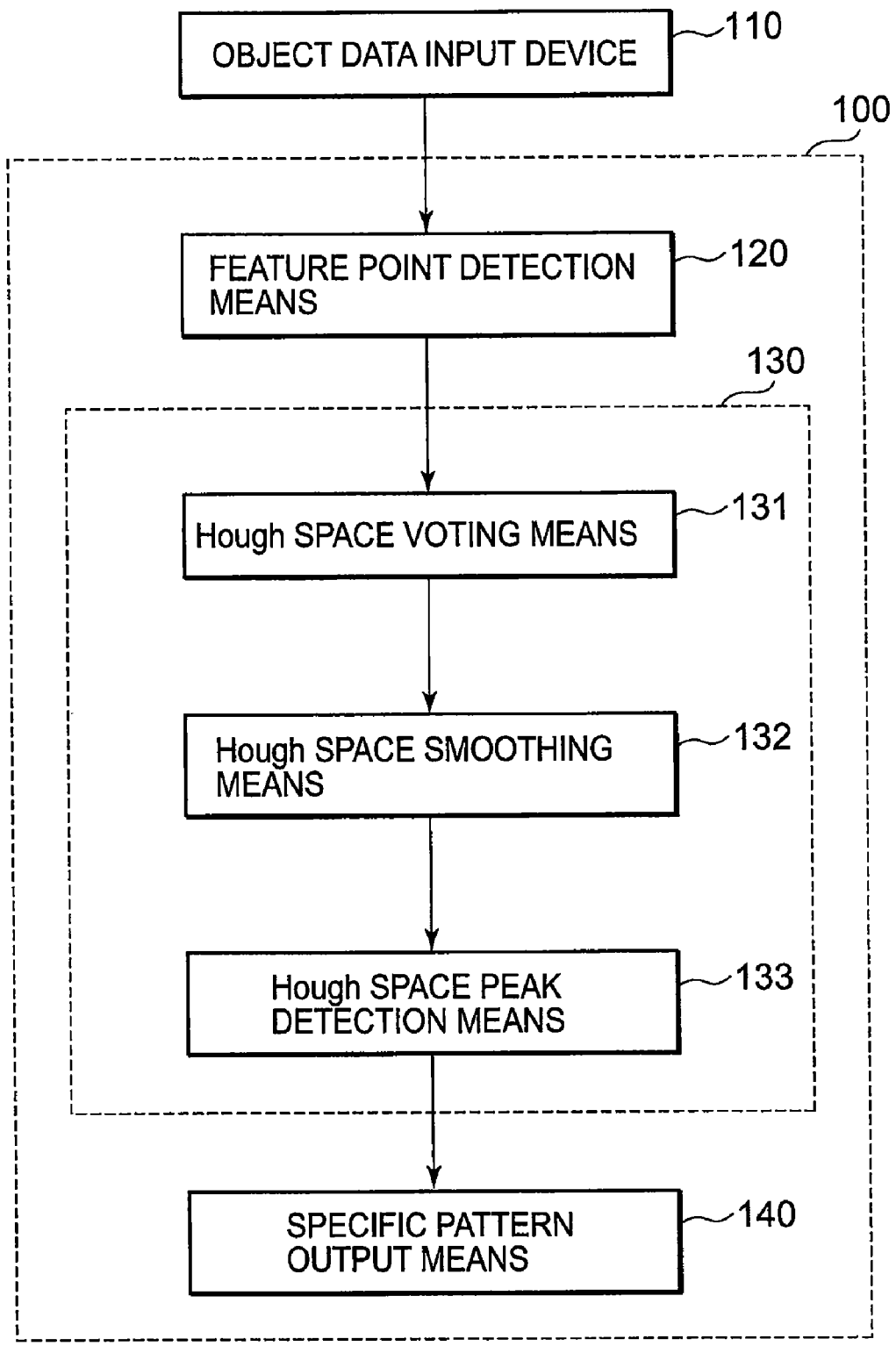
FIG. 2 is a block diagram showing the structure of a recognition system according to a first embodiment of this invention.

Referring to FIG. 2, a first embodiment of this invention comprises a computer (central processing unit; processor; data processing unit) 100 operated under program control and an object data input device 110.

The computer (central processing unit; processor; data processing unit) 100 includes feature point detection means 120, Hough transform means 130, and specific pattern output means 140.

The Hough transform means 130 comprises Hough space voting means 131, Hough space smoothing means 132, and Hough space peak detection means 133.

These means respectively operate as follows.

The object data input device 110 inputs data being a detection object for desired specific patterns.

The feature point detection means 120 detects, as feature points, those points presumed to be points on the specific patterns from the object data.

In a space with the axes representing parameters that express the specific patterns (hereinafter referred to as a Hough space), the Hough space voting means 131 votes weights corresponding to the feature points detected by the feature point detection means 120, with respect to respective points on loci that correspond to the feature points.

With respect to each of the points in the Hough space, the Hough space smoothing means 132 determines a smoothed vote value at the subject point using the vote values of the subject point and its neighboring points. However, depending on the case, the Hough space smoothing means 132 may be omitted.

The Hough space peak detection means 133 detects one or more points giving peaks of the vote values in the Hough space.

With respect to the respective points, giving the peaks of the vote values, detected by the Hough space peak detection means 133, the specific pattern output means 140 outputs the specific patterns corresponding to the parameters corresponding to the detected points.

Herein, the Hough space will be described. Generally, a plurality of different parameter expressions are considered in parameter expression of the specific pattern. Herein, a temporary parameter expression of the specific pattern (hereinafter given as $l''$) is given as $g(x;\alpha'')=0$, where x represents positions of respective points in the object data and $\alpha''$ represents temporary parameters.

In this invention, an inter-specific-pattern distance indicative of a difference between the specific patterns in a predetermined attention region in the object data is defined, wherein there is adopted a parameter expression of the specific pattern such that a magnitude relation of the inter-specific-pattern distance and a magnitude relation of a distance between corresponding points in the Hough space are equivalent to each other.

Specifically, when the two specific patterns are given as $l'''$ and $l''$ and the inter-specific-pattern distance between $l'''$ and $l''$ is given as $f(l''',l'')$, mapping $h:\alpha''\alpha\beta''$ is designed so that an equivalence relation expressed as a formula (1) given below, wherein $\beta''$ is used as parameters that express the specific pattern and a space with the axes representing the parameters $\beta''$ is given as the Hough space. In this case, the parameter expression of the specific pattern becomes $g(x, h^{-1}(\beta''))=0$.

$$f(l''',l'')\leq f(l''',l^k)\Leftrightarrow\|\beta'''-\beta''\|^2\leq\|\beta'''-\beta^k\|^2 \quad (1)$$

Herein, the equivalence relation shown by the foregoing formula (1) is not necessarily established strictly and the parameters $\beta_n$ may be set so that the equivalence relation is approximately established.

When performing the voting to the respective points on the loci in the Hough space corresponding to the feature points by the Hough space voting means 131, it is also possible to perform voting to neighboring ranges of the respective points on the loci determined by noise components considered to be included at the positions of the feature points.

Next, the overall operation of this embodiment will be described in detail with reference to FIG. 2 and a flowchart of FIG. 3.

Figure 3:
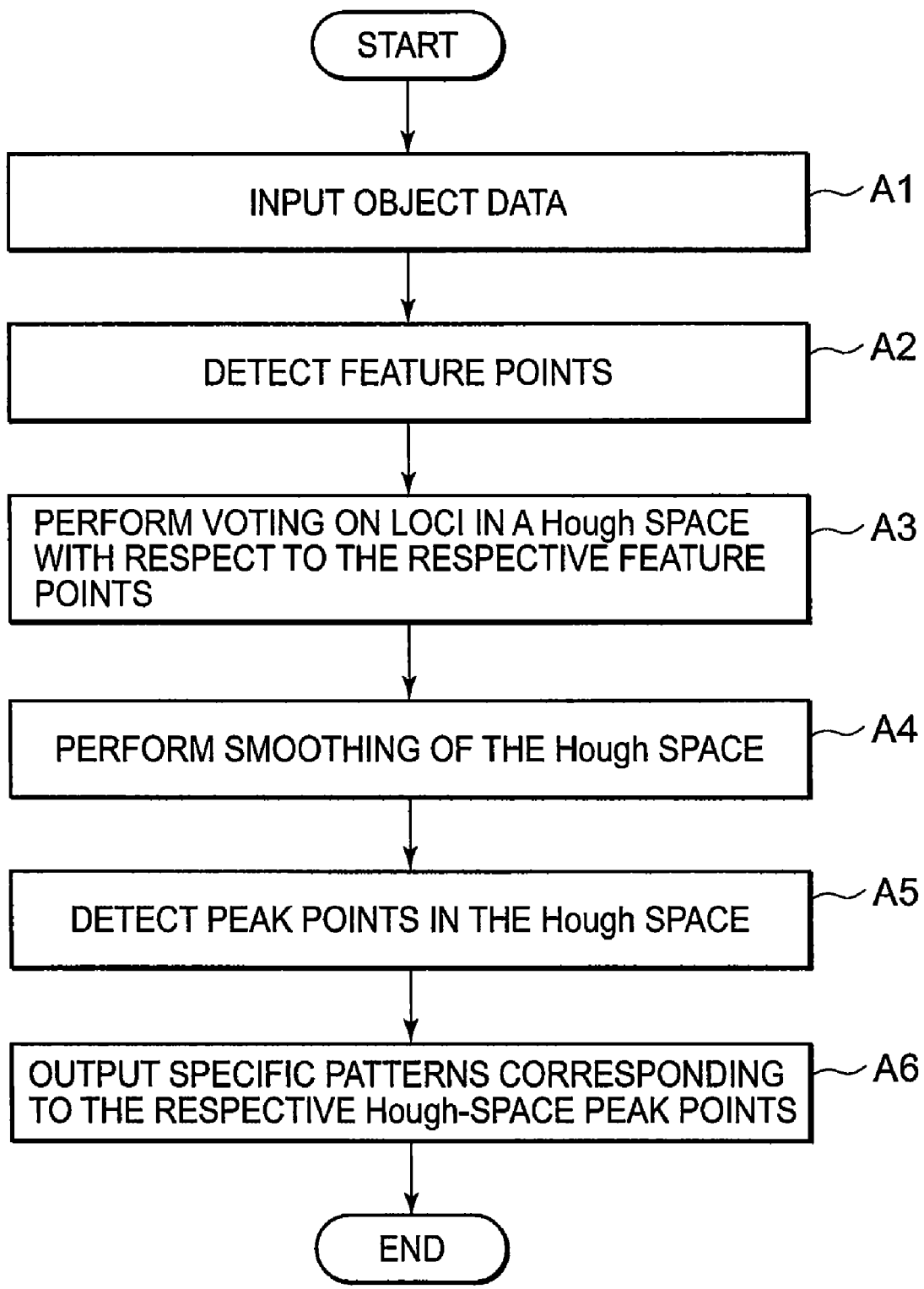
FIG. 3 is a flowchart showing the operation of the recognition system according to the first embodiment.

At first, data to be subjected to the foregoing specific pattern detection processing is input by the object data input device 110 (step A1 in FIG. 3). Then, the feature point detection means 120 detects, as feature points, those points presumed to be points on specific patterns from the object data (step A2). Further, the Hough space voting means 131 votes weights corresponding to the feature points with respect to respective points on loci in a Hough space that correspond to the feature points (step A3). Further, with respect to each of the points in the Hough space, the Hough space smoothing means 132 determines a smoothed vote value at the subject point using the vote values of the subject point and its neighboring points (step A4). However, depending on the case, step A4 may be omitted. Further, the Hough space peak detection means 133 detects one or more points giving peaks of the vote values in the Hough space (step A5). Finally, with respect to the respective points, giving the peaks of the vote values, detected by the Hough space peak detection means, the specific pattern output means 140 outputs the specific patterns corresponding to parameters corresponding to the detected points (step A6). In the voting at step A3, it is also possible to perform voting to neighboring ranges of the respective points on the loci determined by noise components considered to be included at the positions of the feature points.

Next, the effect of this embodiment will be described.

In this embodiment, the inter-specific-pattern distance indicative of the difference between the specific patterns in the predetermined attention region in the object data is defined and the Hough space is formed by the parameter expression of the specific pattern such that the magnitude relation of the inter-specific-pattern distance and the magnitude relation of the distance between the corresponding points in the Hough space are equivalent to or approximately equivalent to each other. Thus, by properly defining the inter-specific-pattern distance, those points closer in distance to each other in the Hough space correspond to closer specific patterns also in the attention region of the object data. Therefore, by performing proper-range smoothing or the like at respective points in the Hough space, it is possible to easily suppress appearance of a false specific pattern near a true specific pattern, which has been the conventional problem.

Further, in this embodiment, the Hough space voting means 131 is configured so that it is also possible to perform voting to neighboring ranges of the respective points on the loci determined by noise components considered to be included at the positions of the feature points. Therefore, it is possible to carry out the specific pattern detection that is strong against the noise components included at the feature points.

Next, the operation of the recognition system according to this embodiment will be described using a specific example.

Figure 4:
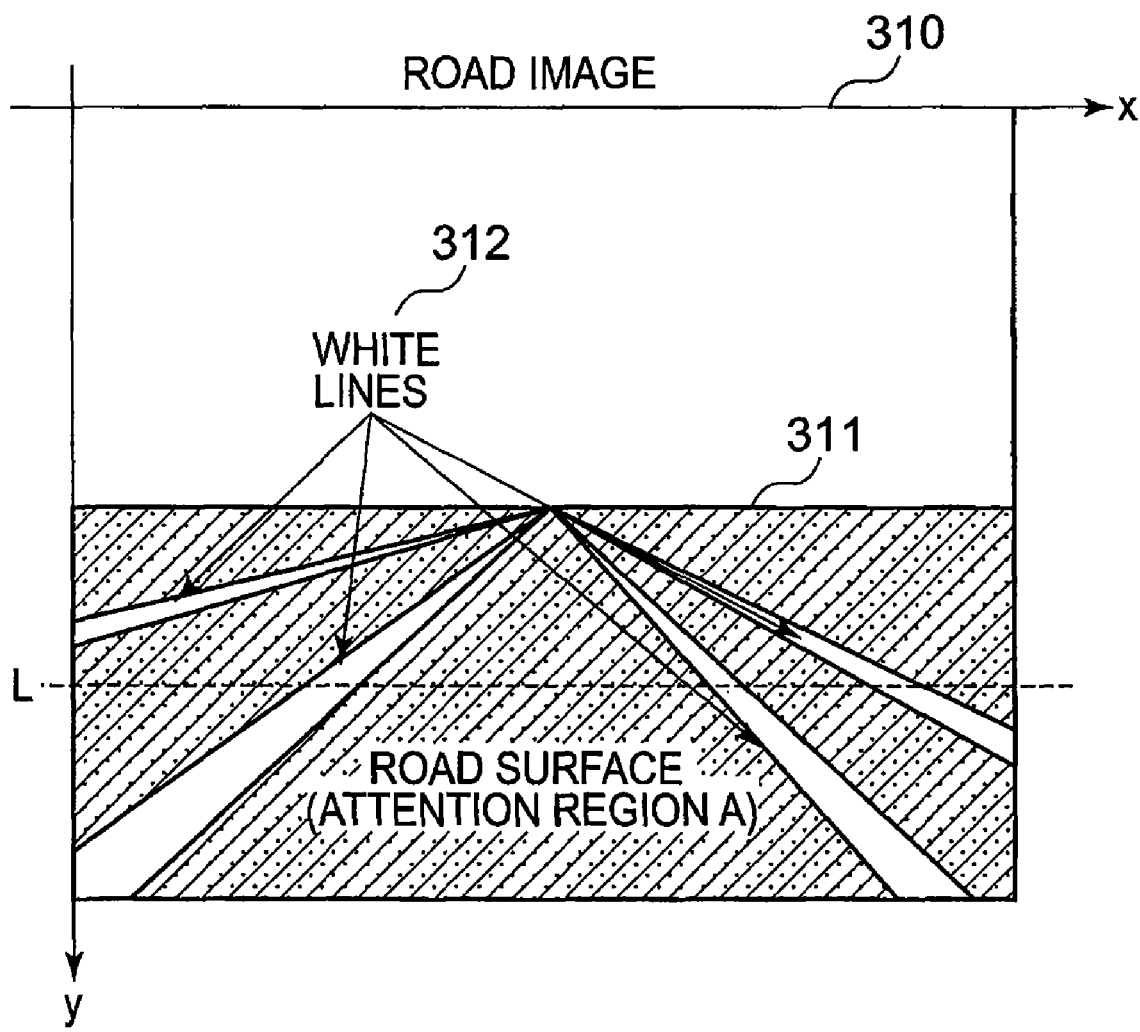
FIG. 4 is a diagram showing a road image as one example of object data.

In the specific example, an image inputted from an input device such as a camera is used as the foregoing object data, a plurality of points where a change in pixel value is sharp (hereinafter referred to as edge points) are detected as the foregoing feature points, and straight lines formed by those edge points are detected as the foregoing specific patterns. A description will be given using, as a specific example of the image, a road image 310 as shown in FIG. 4 which is obtained by photographing a road using a camera mounted on a vehicle or the like. By detecting straight lines from the road image, white lines 312, representing running lane boundaries, drawn on a road surface 311, and so on are recognized.

Figure 5:
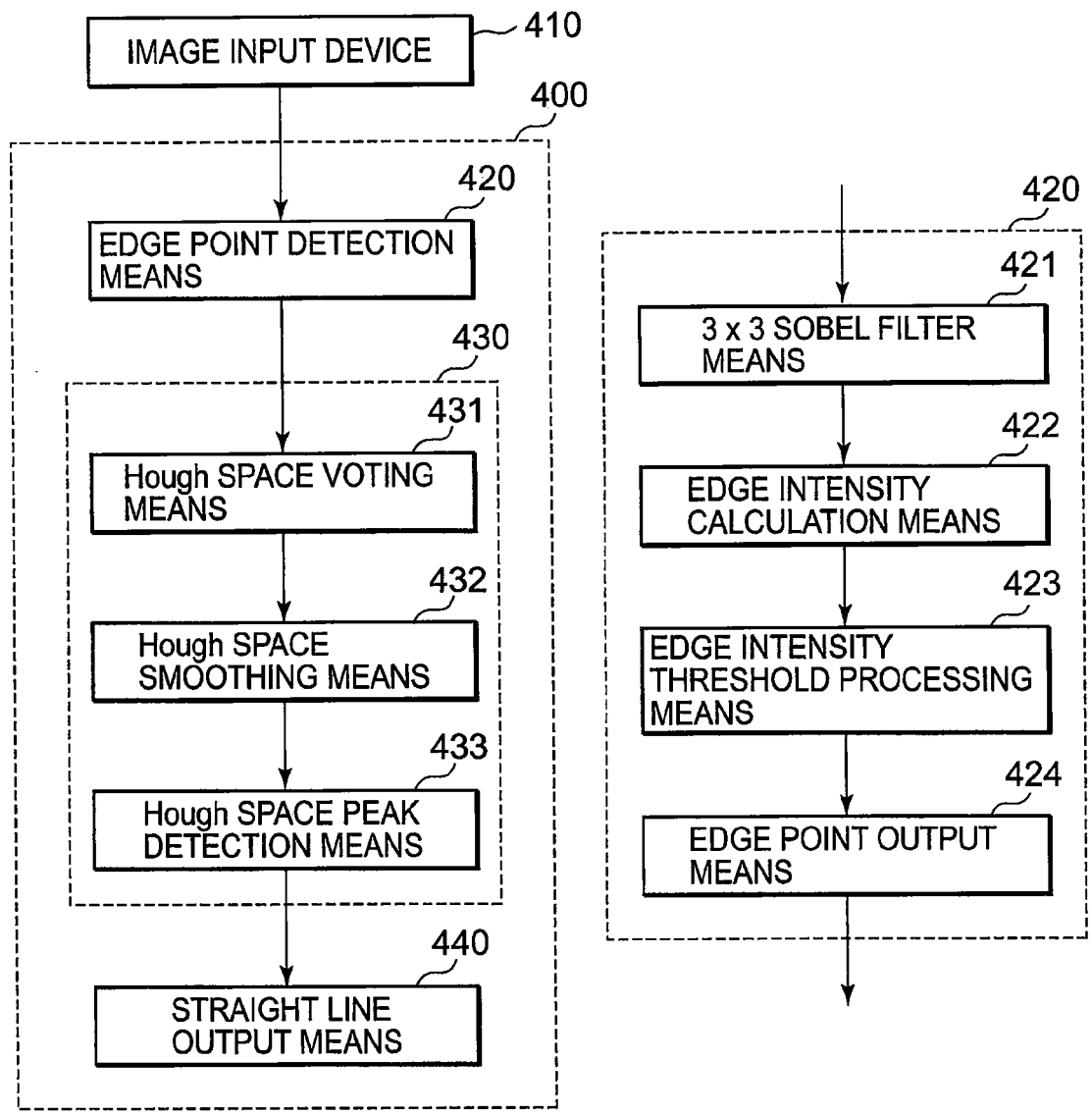
FIG. 5 is a block diagram showing a specific structure of the recognition system according to the first embodiment.

As shown in FIG. 5, the recognition system according to this example comprises an image input device 410 such as, for example, a camera, as the foregoing object data input device 110, edge point detection means 420 as the foregoing feature point detection means 120, Hough transform means 430, and straight line output means 440 as the foregoing specific pattern output means 140.

The edge point detection means 420 comprises 3×3 Sobel filter means 421, edge intensity calculation means 422, edge intensity threshold processing means 423, and edge point output means 424. However, the edge point detection means 420 is not limited to the above structure and may be any means as long as it can detect a point where a change in pixel value is sharp.

The Hough transform means 430 comprises Hough space voting means 431, Hough space smoothing means 432, and Hough space peak detection means 433.

The road image 310 is input as the object data by the image input device 410. The edge point detection means 420 detects the plurality of edge points. The Hough transform means 430 carries out the same processing as the foregoing Hough transform means 130 with respect to a Hough space defined as a two-dimensional plane with the axis of abscissas and the axis of ordinates respectively representing elements a' and b' of two-dimensional parameters $\beta=(a',b')^T$ (T represents transpose) in a later-described straight-line parameter expression $g^l(x, h^{-1}(\beta))=0$.

The straight line detection means 440 outputs straight lines, expressed by the straight-line parameter expression $g^l(x, h^{-1}(\beta))=0$, corresponding to respective points in the Hough space, giving peaks of vote values, detected by the Hough transform means 430.

Figures 6, 7:
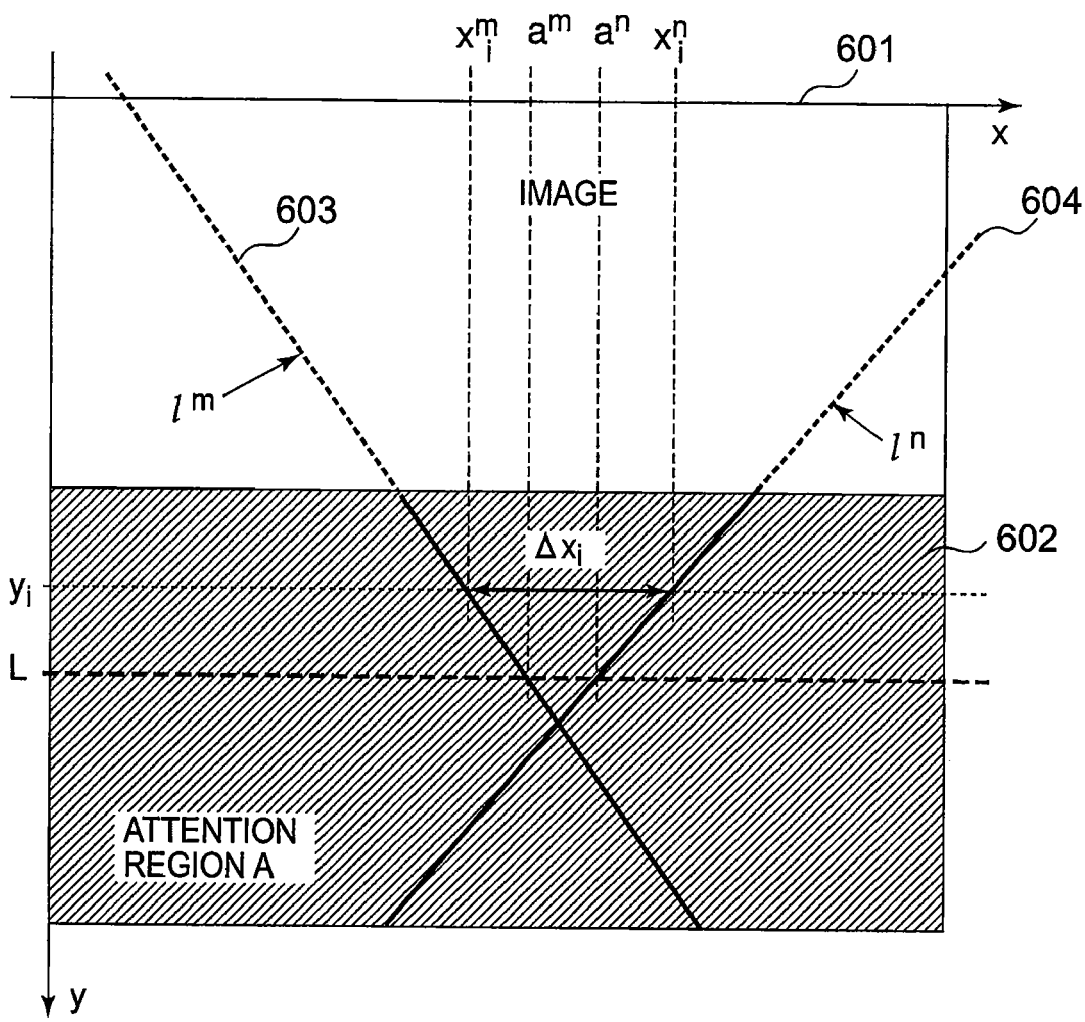
FIG. 6 is a diagram for explaining a Sobel filter.
FIG. 7 is a diagram for explaining an inter-straight-line distance.

The 3×3 Sobel filter means 421 derives the sums of the products of respective pixel values in a 3×3 neighborhood and respective coefficients of an x-direction gradient kernel and a y-direction gradient kernel shown in FIG. 6, with respect to each of points in the road image 310. These product sums are called a Sobel x component and a Sobel y component, respectively.

The edge intensity calculation means 422 calculates the square root of the sum of the squares of or the sum of absolute values of the Sobel x component and the Sobel y component with respect to each point in the road image 310 and sets it as an edge intensity of each point in the road image 310. The edge intensity threshold processing means 423 judges whether or not the edge intensity of each point in the road image 310 is equal to or greater than a predetermined threshold value, for example, 100. The edge point output means 424 outputs, as edge points, those points whose edge intensities are judged to be equal to or greater than the threshold value by the edge intensity threshold processing means 423.

In a space with the axes representing the parameters that express the straight lines (hereinafter referred to as a Hough space), the Hough space voting means 431 votes weights corresponding to the edge points detected by the edge point detection means 420, with respect to respective points on loci that correspond to the edge points.

Herein, processing is carried out to vote the edge intensities as the weights corresponding to the edge points. However, the weights corresponding to the edge points are not limited thereto. For example, use may be made of constants, values calculated from the pixel values of the edge points or their neighboring points and so on, such as an angle formed between the gradient of the pixel values at the edge points calculated by the Sobel x components and the Sobel y components and the slope of the straight line corresponding to the points on the loci, which will be described later, values calculated from these values and the edge intensities, or the like.

With respect to each of the points in the Hough space, the Hough space smoothing means 432 determines a smoothed vote value at the subject point using the vote values of the subject point and its neighboring points. Herein, the smoothed vote value is determined, for example, as an average value of points in a 3×3 neighborhood of the subject point. However, the range of the neighborhood and the smoothed vote value determining method are not limited thereto. Further, depending on the case, the Hough space smoothing means 432 may be omitted.

The Hough space peak detection means 433 detects those points each being equal to or greater than a predetermined threshold value and each having a maximum vote value in a neighboring range such as, for example, a 3×3 neighborhood, as the peaks in the Hough space. However, the criterion for detecting the peak is not limited thereto. It is possible to employ the criterion according to setting of a subject, wherein, for example, only a point having a maximum vote value in the Hough space is detected as a peak.

Herein, the straight-line parameter expression $g^l(x, h^{-1}(\beta))= 0$ will be described. A straight-line parameter expression $g^l(x, \alpha)=0$ using temporary parameters $\alpha=(a,b)^T$ is defined as a formula (2).

$$g^l(x,\alpha)=x-(a+b(y-L))=0 \qquad (2)$$

where $x=(x,y)^T$ represents coordinates of each point in the road image 310 and L represents a y-coordinate of a certain horizontal line in the road image 310 as shown in FIG. 4.

The foregoing attention region is set as a lower region of the road image 310, for example, as a region below a central horizontal line, as shown in FIG. 4. This attention region A311 is a region expected to correspond to the road surface in the road image 310. Herein, as shown in FIG. 7, an inter-straight-line distance $f^i(l^m,l^n)$ corresponding to the foregoing inter-specific-pattern distance is defined as formulas (3), where $l^m$ and $l^n$ represent straight lines, respectively.

$$f^i(l^m, l^n) = \frac{1}{N(A)} \sum_{y_i \in A} (\Delta x_i)^2 \tag{3}$$

$$\Delta x_i = x_i^m - x_i^n, \quad N(A) = \sum_{y_i \in A} 1$$

$$x_i^k = a^k + b^k(y_i - L)$$

where $y_i$ represents y-coordinates in the attention region A311 and is normally discretized at certain regular intervals. In this example, it is assumed that $y_i$ is discretized at intervals of 1. $N(A)$ represents the number of horizontal lines in the attention region A311.

From FIG. 7 and the formulas (3), the inter-straight-line distance $f^i(l^m,l^n)$ is the sum of the squares of differences between x-coordinates on the respective horizontal lines in the attention region A311 and, when m=n, $f^i(l^m,l^n)=0$.

Further, since $f^i(l^m,l^n)$ satisfies the positivity preserving property, the symmetry between $l^m$ and $l^n$, and a trigonometric inequality $f^i(l^m,l^n) \leq f^i(l^m,l^k)+f^i(l^k,l^n)$, it has an appropriate property as a distance function. $f^i(l^m,l^n)$ being close represents that the positions of $l^m$ and $l^n$ on the respective horizontal lines in the attention region A311 are close to each other. Therefore, it is considered to be also well fit for sensuous "closeness" between straight lines.

Herein, the formulas (3) are transformed into a formula (4).

$$f^i(l^m, l^n) = \frac{1}{N(A)} \sum_{y_i \in A} \{(a^m - a^n) + (b^m - b^n)(y_i - L)\}^2 \tag{4}$$

$$= \begin{pmatrix} a^m - \\ a^n \end{pmatrix}^T \begin{pmatrix} 1 & \frac{1}{N(A)} \sum_{y_i \in A} (y_i - L) \\ \frac{1}{N(A)} \sum_{y_i \in A} (y_i - L) & \frac{1}{N(A)} \sum_{y_i \in A} (y_i - L)^2 \end{pmatrix} \begin{pmatrix} a^m - \\ a^n \end{pmatrix}$$

$$\equiv (\alpha^m - \alpha^n)^T B (\alpha^m - \alpha^n)$$

Herein, if $B=C^T C$ in the formula (4), a formula (5) is established for parameters $\beta$, where $\beta=h(\alpha)=C\alpha$. Since B is a symmetric matrix, the presence of C is ensured.

$$f^i(l^m,l^n) = \|\beta^m - \beta^n\|^2 \tag{5}$$

Therefore, from the above formula (5), if f=f', the formula (1) is established.

A magnitude relation of a distance between points in the Hough space defined as a two-dimensional plane with the axis of abscissas and the axis of ordinates respectively representing the elements a' and b' of the parameters $\beta=(a',b')$ and a magnitude relation of a corresponding inter-straight-line distance are equivalent to each other. Particularly, if $$L = \sum_{y_i \in A} (y_i - L)/N(A)$$

in the foregoing formula (2), i.e. L represents a y-coordinate of a horizontal line located in the middle of the attention region A311, the straight-line parameter expression is given by the following formula (6).

$$g^l(x, h^{-1}(\beta)) = x - \left( a' + \frac{b'}{\sqrt{\frac{1}{N(A)} \sum_{y_i \in A} (y_i - L)^2}} (y - L) \right) = 0 \tag{6}$$

Next, the Hough space will be described. In the Hough space, the Hough space voting means 431 votes weights corresponding to the edge points detected by the edge point detection means 420, with respect to respective points on loci that correspond to the edge points. In this event, it is necessary to discretize the Hough space for realizing the Hough space voting means 431 in the computer 400. Assuming that the straight-line parameter expression is given by the above formula (6), the parameter a'=a in the formula (6) is an intercept of the straight line on the horizontal line y=L in the road image as shown in FIG. 7.

Therefore, it may be considered that the accuracy thereof is equal to an x-direction position accuracy of each point in the road image. Herein, assuming that the error in position of each point in the road image is caused only by the coordinate discretization, the discretization interval is set to 1 in this example.

Accordingly, the parameter a' may also be set at intervals of 1.

On the other hand, if the error in position of each point in the road image is further caused by a factor other than the coordinate discretization, the interval of the parameter a' may be determined based on an error range about the position of each point in the road image, also taking that factor into account.

Herein, the discretization interval of the parameter b' may be set equal to that of the parameter a' for maintaining the relationship of the formula (1).

As described above, according to this invention, it is possible to automatically determine the discretization interval of the Hough space from the error range of the object data.

Next, the Hough space voting means 431 will be supplementarily described. Although the Hough space voting means 431 votes, in the Hough space, weights corresponding to the edge points detected by the edge point detection means 420, with respect to respective points on loci that correspond to the edge points, it is also possible to perform voting not only to the respective points on the loci, but to neighboring ranges of the respective points on the loci determined by noise components considered to be included at the positions of the edge points. In this example, at the time of the voting, only those noise components caused by the coordinate discretization are considered as the noise components included at the positions of the edge points. In this case, it is considered that a true position of an edge point detected at a certain pixel position $(x_j, y_j)^T$ in the road image is located in a range of a formula (7).

$$\left\{ (x, y) \,\middle|\, x_j - \frac{1}{2} < x < x_j + \frac{1}{2}, y_j - \frac{1}{2} < y < y_j + \frac{1}{2} \right\} \tag{7}$$

Figure 8:
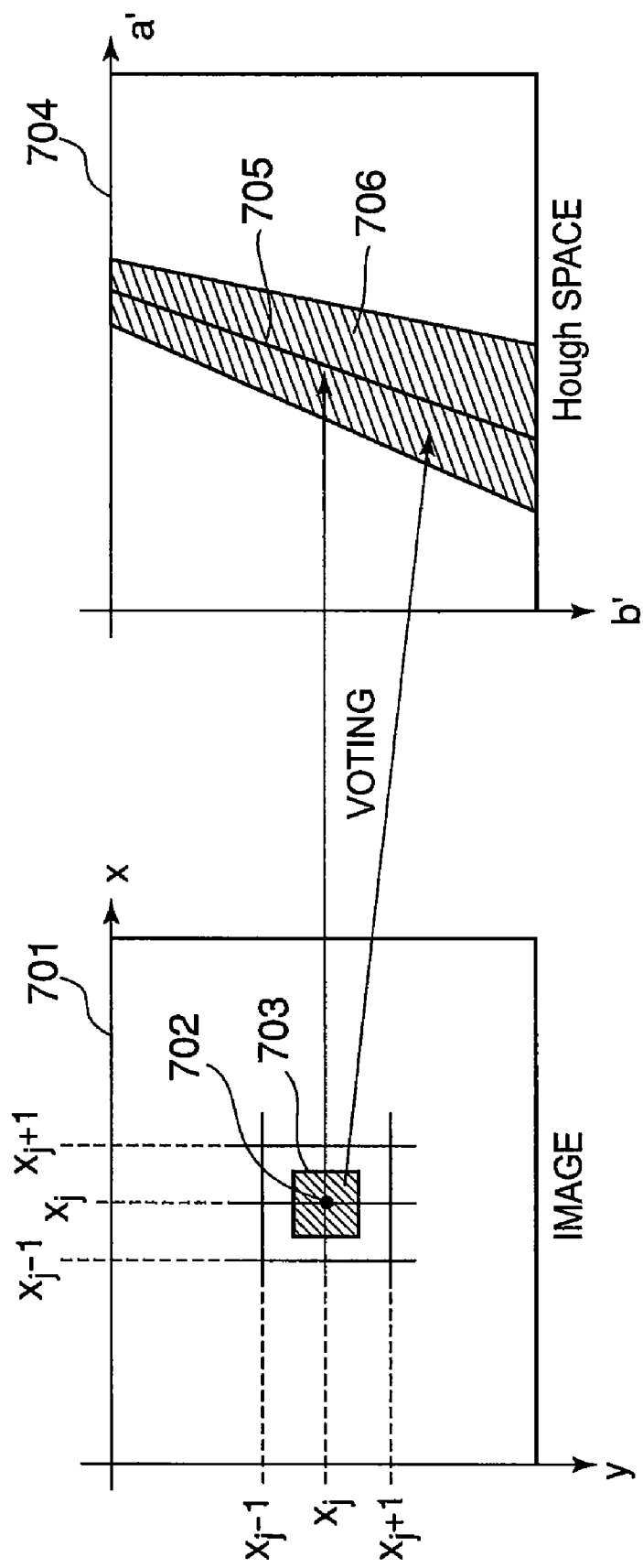
FIG. 8 is a diagram for explaining a method of voting to a Hough space, taking into account the quantization error.

Herein, as shown in FIG. 8, a weight corresponding to an edge point 702 is voted not only to a locus 705 in the Hough space corresponding to the edge point 702, but to a set 706 of loci in the Hough space corresponding to all points in a true position range 703 of the edge point expressed by the above formula (7). This makes it possible to suppress the influence of noise components caused by the coordinate discretization.

Next, the operation of this example comprising the components described above will be described in detail with reference to FIG. 5 and a flowchart of FIG. 9.

Figure 9:
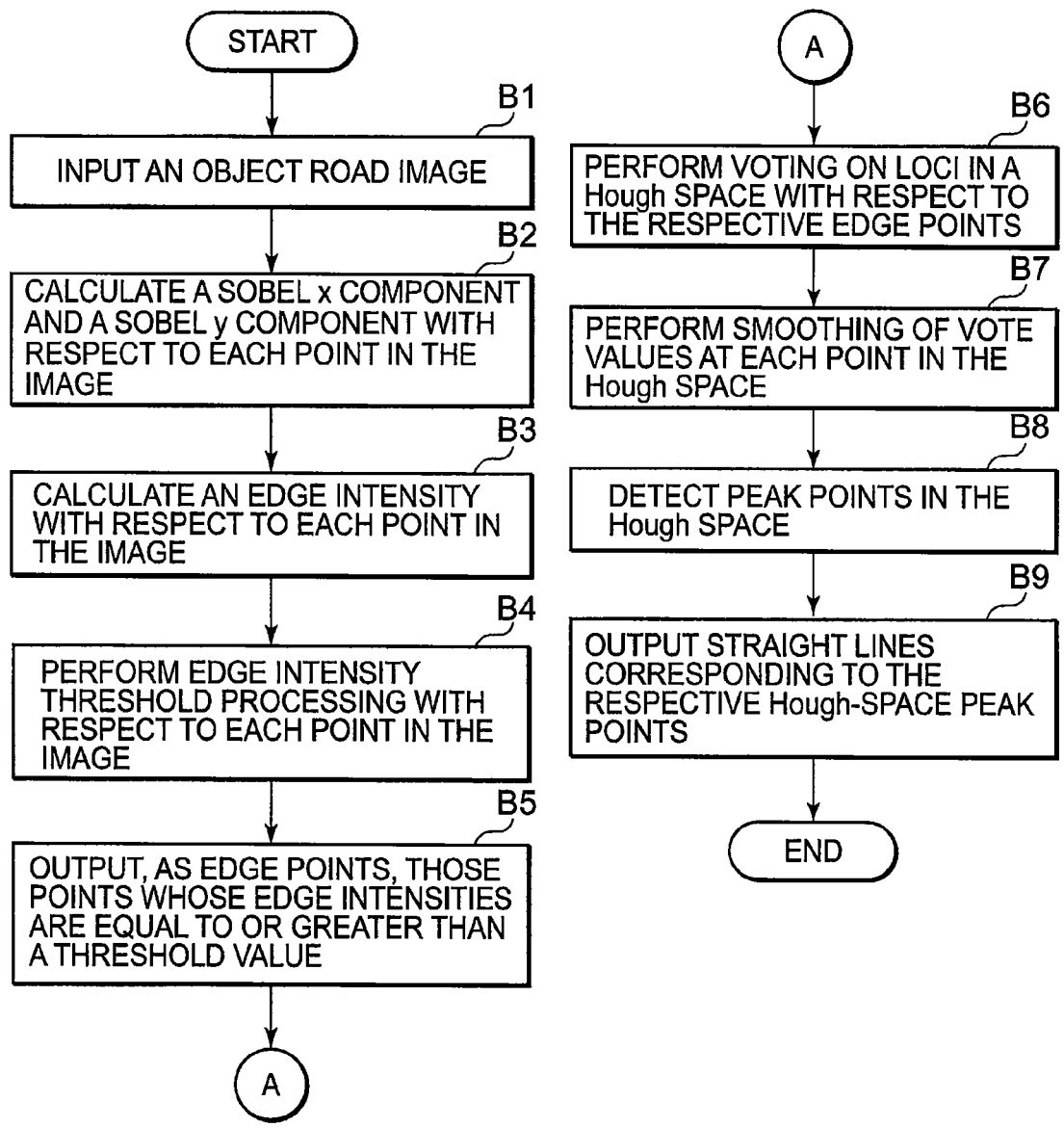
FIG. 9 is a diagram showing a specific example of the operation of the recognition system according to the first embodiment.

At first, the road image is input by the image input device 410 (step B1 in FIG. 9). Then, the Sobel filter means 421 calculates a Sobel x component and a Sobel y component with respect to each point in the road image (step B2). Further, the edge intensity calculation means 422 calculates an edge intensity with respect to each point in the road image (step B3). Further, the edge intensity threshold processing means 423 performs the edge intensity threshold processing with respect to each point in the road image (step B4). Further, the edge point output means 424 outputs, as edge points, those points whose edge intensities are equal to or greater than the threshold value (step B5). Further, the Hough space voting means 431 performs voting to loci in the Hough space with respect to the respective edge points (step B6). Further, the Hough space smoothing means 432 performs smoothing of the vote values at each point in the Hough space (step B7). Further, the Hough space peak detection means 433 detects peak points in the Hough space (step B8). Finally, the straight line output means 440 outputs straight lines corresponding to the respective Hough-space peak points (step B9).

In this example, the object data is an image. However, the object data is not limited thereto, but may be any data as long as coordinate positions and data values at the respective positions are mapped to each other therein, such as, for example, a distance image in which a pixel value represents a distance to a corresponding actual object, a three-dimensional image in which pixel values are given at respective positions in a three-dimensional space, or a time-series image obtained by arranging, in a time-series direction, the above images or the above three-dimensional images obtained at different times.

Further, in this example, the inter-straight-line distance is defined as the sum of the squares of differences between x-coordinates on the respective horizontal lines in the attention region A311. However, it may be the sum of the squares of distances between positions on respective lines of a set of mutually parallel lines such as vertical lines, not limited to the horizontal lines.

Further, in this example, the inter-straight-line distance is defined as the sum of the squares of distances between positions on respective lines of a set of mutually parallel lines. However, it is not limited to the sum of the squares, but may be a quantity defined as a distance between vectors corresponding to two straight lines when a set of positions of each straight line on the respective lines of the set of mutually parallel lines is regarded as one vector, such as the sum of the absolute values or the maximum value of the absolute values.

Further, the following formula (8) may be used as the straight-line parameter expression $g^l(x,\alpha)=0$ instead of the foregoing formula (2).

$$g^l(x,\alpha) = x - \left(a + \frac{1}{\tan\theta}(y-L)\right) = 0 \text{ where } \alpha = (a, \theta)^T \quad (8)$$

Further, the following formula (9) may be used instead of the straight-line parameter expression by the above formula (8).

$$g^l(x,\alpha) = x - \left(\frac{\max\left(\left|\frac{1}{\tan\theta}\right|, 1\right)a +}{\frac{1}{\tan\theta}(y-L)}\right) = 0 \text{ where } \alpha = (a,\theta)^T \quad (9)$$

The Hough space based on the parameter expression by the above formula (8) or the above formula (9) does not strictly satisfy the relationship of the foregoing formula (1), but is considered to approximately satisfy it. Therefore, even in this case, the effect of this example can be expected to some degree.

The straight-line parameter expression by the above formula (9) is obtained by transforming the straight-line parameter expression by the above formula (8) so as to remove the influence of the noise components caused by the coordinate discretization in the Hough transform. Therefore, in the Hough transform using the Hough space based on the straight-line parameter expression by the formula (9), voting to the locus set 706 shown by FIG. 8 and the foregoing formula (7) is not required, but voting to only the locus 705 is required. In this case, the processing amount can be reduced as compared with the voting to the locus set 706.

Next, the best mode for carrying out a second invention of this invention will be described in detail with reference to the drawings.

Figure 10:
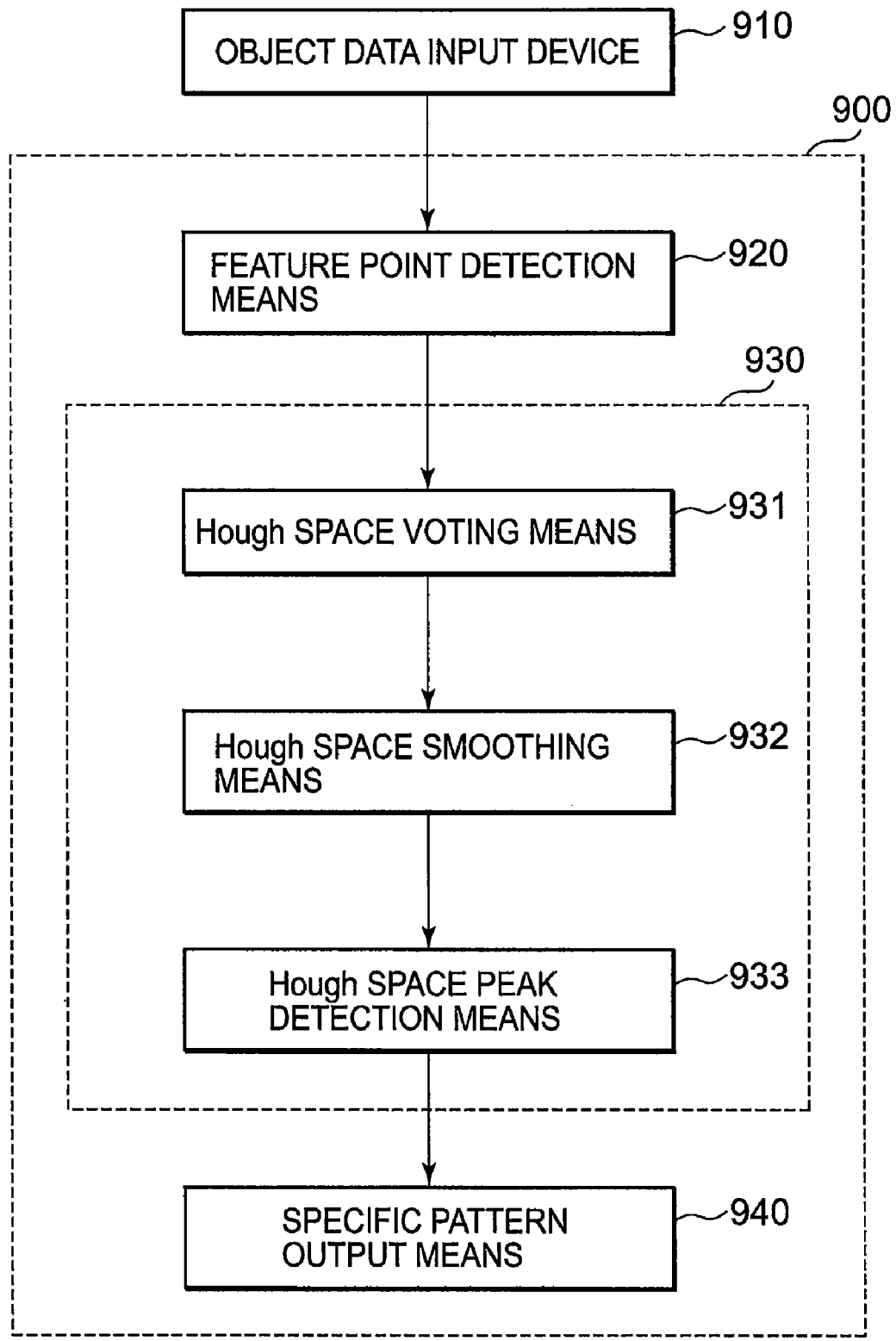
FIG. 10 is a block diagram showing the structure of a recognition system according to a second embodiment of this invention.

Referring to FIG. 10, a recognition system according to a second embodiment of this invention comprises a computer (central processing unit; processor; data processing unit) 900 operated under program control and an object data input device 910.

The computer (central processing unit; processor; data processing unit) 900 includes feature point detection means 920, Hough transform means 930, and specific pattern output means 940.

The Hough transform means 930 comprises Hough space voting means 931, Hough space smoothing means 932, and Hough space peak detection means 933.

These means respectively operate as follows.

The object data input device 910 inputs data being a detection object for desired specific patterns.

The feature point detection means 920 detects, as feature points, those points presumed to be points on the specific patterns from the object data.

In a Hough space expressing the specific patterns, the Hough space voting means 931 votes weights corresponding to the feature points detected by the feature point detection means 920, with respect to respective points on loci that correspond to the feature points.

With respect to each of the points in the Hough space, the Hough space smoothing means 932 determines a smoothed vote value at the subject point using the vote values of the subject point and its neighboring points.

The Hough space peak detection means 933 detects one or more points giving peaks of the vote values in the Hough space.

With respect to the respective points, giving the peaks of the vote values, detected by the Hough space peak detection means 933, the specific pattern output means 940 outputs the specific patterns corresponding to the parameters corresponding to the detected points.

Herein, the Hough space smoothing means 932 will be described. A parameter expression of the specific pattern $l''$ is given as $g(x;\alpha'')=0$, where x represents positions of respective points in the object data and $\alpha''$ represents parameters.

In the second embodiment of this invention, like in the first embodiment of this invention, an inter-specific-pattern distance indicative of a difference between the specific patterns $l'''$ and $l''$ in a predetermined attention region in the object data is defined as $f(l''',l'')$.

With respect to each of the points an in the Hough space, the Hough space smoothing means 932 considers the corresponding specific pattern $l''$, further considers a set of points $\alpha'''$ in the Hough space corresponding to the specific pattern $l'''$ satisfying the following formula (10) to be a neighborhood of the subject point, and determines a smoothed vote value at the subject point using the vote values of the points in this neighborhood or in a region approximating this neighborhood.

$$f(l''',l'') \leq r \quad (10)$$

where r represents a predetermined constant or a number determined for each point in the Hough space according to some standard.

When performing the voting to the respective points on the loci in the Hough space corresponding to the feature points by the Hough space voting means 931, it is also possible to perform voting to neighboring ranges of the respective points on the loci determined by noise components considered to be included at the positions of the feature points.

Figure 11:
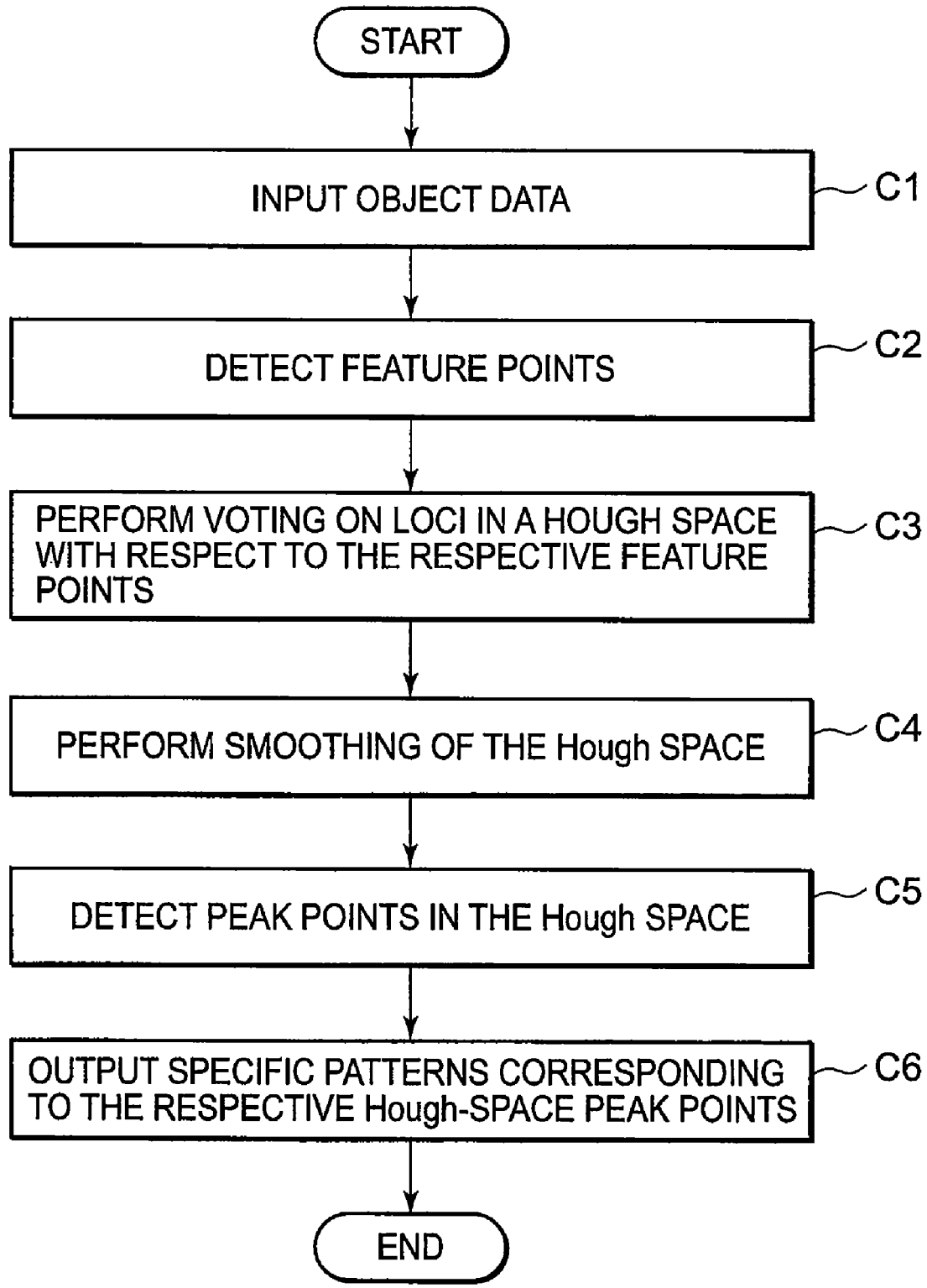
FIG. 11 is a flowchart showing the operation of the recognition system according to the second embodiment.

Next, the overall operation of this embodiment will be described in detail with reference to FIG. 10 and a flowchart of FIG. 11.

At first, data to be subjected to the foregoing specific pattern detection processing is input by the object data input device 910 (step C1 in FIG. 3). Then, the feature point detection means 920 detects, as feature points, those points presumed to be points on specific patterns from the object data (step C2). Further, the Hough space voting means 931 votes weights corresponding to the feature points with respect to respective points on loci in a Hough space that correspond to the feature points (step C3). Further, with respect to each of the points in the Hough space, the Hough space smoothing means 932 determines a smoothed vote value at the subject point using the vote values of the subject point and its neighboring points (step C4). Further, the Hough space peak detection means 933 detects one or more points giving peaks of the vote values in the Hough space (step C5). Finally, with respect to the respective points, giving the peaks of the vote values, detected by the Hough space peak detection means, the specific pattern output means 940 outputs the specific patterns corresponding to parameters corresponding to the detected points (step C6).

In the voting at step C3, it is also possible to perform voting to neighboring ranges of the respective points on the loci determined by noise components considered to be included at the positions of the feature points.

Next, the effect of this embodiment will be described.

In this embodiment, the inter-specific-pattern distance indicative of the difference between the specific patterns in the predetermined attention region in the object data is defined, wherein a region with the inter-specific-pattern distance being close is considered as a neighborhood and the Hough-transform smoothing is carried out in the neighboring range. Therefore, by properly defining the inter-specific-pattern distance, it is possible to easily suppress appearance of a false specific pattern near a true specific pattern, which has been the conventional problem.

Further, in this embodiment, the Hough space voting means 131 is configured so that it is also possible to perform voting to neighboring ranges of the respective points on the loci determined by noise components considered to be included at the positions of the feature points. Therefore, it is possible to carry out the specific pattern detection that is strong against the noise components included at the feature points.

Next, the operation of the recognition system according to this embodiment will be described using a specific example.

In this recognition system, an image inputted from an input device such as a camera is used as the foregoing object data, a plurality of points where a change in pixel value is sharp (hereinafter referred to as edge points) are detected as the foregoing feature points, and straight lines formed by those edge points are detected as the foregoing specific patterns. As a specific example of the image, use is made of a road image 310 as shown in FIG. 4 which is obtained by photographing a road using a camera mounted on a vehicle or the like. By detecting straight lines from the road image, white lines 312, representing running lane boundaries, drawn on a road surface 311, and so on are recognized.

Figure 12:
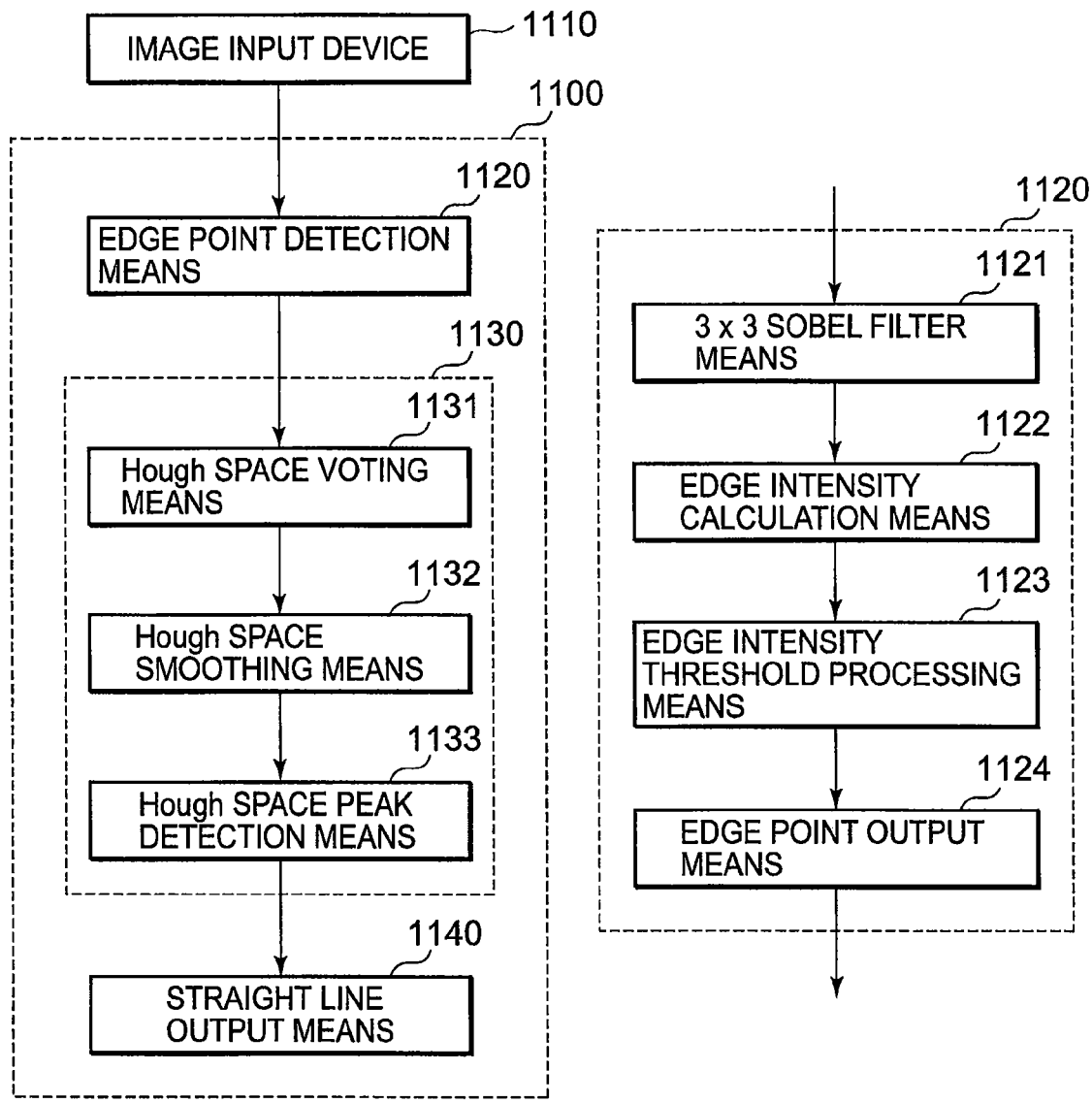
FIG. 12 is a block diagram showing a specific structure of the recognition system according to the second embodiment.

As shown in FIG. 12, the recognition system according to this example comprises an image input device 1110 such as, for example, a camera, as the foregoing object data input device 910, edge point detection means 1120 as the foregoing feature point detection means 920, Hough transform means 1130, and straight line output means 1140 as the foregoing specific pattern output means 940.

The edge point detection means 1120 comprises 3×3 Sobel filter means 1121, edge intensity calculation means 1122, edge intensity threshold processing means 1123, and edge point output means 1124. However, the edge point detection means 1120 is not limited to the above structure and may be any means as long as it can detect a point where a change in pixel value is sharp.

The Hough transform means 1130 comprises Hough space voting means 1131, Hough space smoothing means 1132, and Hough space peak detection means 1133.

The image input device 1110 inputs the road image 310 as the object data. The edge point detection means 1120 detects the plurality of edge points. The Hough transform means 1130 carries out the same processing as the foregoing Hough transform means 930 with respect to a Hough space defined as a two-dimensional plane with the axis of abscissas and the axis of ordinates respectively representing elements a and b of two-dimensional parameters $\alpha=(a,b)^T$ (T represents transpose) in a later-described straight-line parameter expression $g^l(x,\alpha)=0$.

The straight line detection means 1140 outputs straight lines, expressed by the straight-line parameter expression $g^l(x,\alpha)=0$, corresponding to respective points in the Hough space, giving peaks of vote values, detected by the Hough transform means 1130.

The 3×3 Sobel filter means 1121 calculates a Sobel x component and a Sobel y component with respect to each of points in the road image 310. The edge intensity calculation means 1122 calculates the square root of the sum of the squares of or the sum of absolute values of the Sobel x component and the Sobel y component with respect to each point in the road image 310 and sets it as an edge intensity of each point in the road image 310.

The edge intensity threshold processing means 1123 judges whether or not the edge intensity of each point in the road image 310 is equal to or greater than a predetermined threshold value, for example, 100.

The edge point output means 1124 outputs, as edge points, those points whose edge intensities are judged to be equal to or greater than the threshold value by the edge intensity threshold processing means 1123.

The Hough space voting means 1131 votes, in the Hough space, weights corresponding to the edge points detected by the edge point detection means 1120, with respect to respective points on loci that correspond to the edge points. Herein, the edge intensities are voted as the weights corresponding to the edge points. However, the weights corresponding to the edge points are not limited thereto. For example, use may be made of constants, values calculated from the pixel values of the edge points or their neighboring points and so on, such as an angle formed between the gradient of the pixel values at the edge points calculated by the Sobel x components and the Sobel y components and the slope of the straight line corresponding to the points on the loci, which will be described later, values calculated from these values and the edge intensities, or the like.

With respect to each of the points in the Hough space, the Hough space smoothing means 1132 uses the vote values of the subject point and its neighboring points to determine a smoothed vote value at the subject point, for example, as an average value of the vote values of the points in the neighborhood. However, the smoothed vote value is not limited thereto. Use may be made of various values calculated from a positional relationship or vote values of points in a neighborhood, such as the sum of the products of points in a neighborhood and proper weights or the maximum vote value in a neighborhood.

The Hough space peak detection means 1133 detects those points each being equal to or greater than a predetermined threshold value and each having a maximum vote value in a neighboring range such as, for example, a 3×3 neighborhood, as the peaks in the Hough space. However, the criterion for detecting the peak is not limited thereto. It is possible to employ the criterion according to setting of a subject, wherein, for example, only a point having a maximum vote value in the Hough space is detected as a peak.

Herein, the Hough space smoothing means 1132 will be described.

It is assumed that the straight-line parameter expression $g^l(x,\alpha)=0$ is given as the following formula (11).

$$g^l(x,\alpha)=x-(a+b(y-L))=0 \qquad (11)$$

where $x=(x,y)^T$ represents coordinates of each point in the road image 310 and L represents a y-coordinate of a certain horizontal line in the road image 310 as shown in FIG. 4.

The foregoing attention region is set as a lower region of the road image 310, for example, as a region below a central horizontal line, as shown in FIG. 4. This attention region A311 is a region expected to correspond to the road surface in the road image 310. Herein, like in the first embodiment of this invention, as shown in FIG. 7, an inter-straight-line distance $f^l(l^m,l^n)$ corresponding to the foregoing inter-specific-pattern distance is defined as the foregoing formulas (3), where $l^m$ and $l^n$ represent straight lines, respectively.

Herein, according to the foregoing formula (4), the formula (10) can be transformed into the following formula (12).

$$f^l(l^m, l^n) = \begin{pmatrix} \alpha^m - \\ \alpha^n \end{pmatrix}^T \begin{pmatrix} 1 & \frac{1}{N(A)} \sum_{y_i \in A}(y_i - L) \\ \frac{1}{N(A)} \sum_{y_i \in A}(y_i - L) & \frac{1}{N(A)} \sum_{y_i \in A}(y_i - L)^2 \end{pmatrix} \begin{pmatrix} \alpha^m - \\ \alpha^n \end{pmatrix} \qquad (12)$$

$$\equiv (\alpha^m - \alpha^n)^T B(\alpha^m - \alpha^n) \le r$$

Accordingly, with respect to each of points $\alpha^n$ in the Hough space, the Hough space smoothing means 1132 can set, as the smoothed vote value, an average value of the vote values in a set $\{\alpha^m | (\alpha^m - \alpha^n)^T B(\alpha^m - \alpha^n) \le r\}$ of points satisfying $(\alpha^m - \alpha^n)^T B(\alpha^m - \alpha^n) \le r$ or in an approximate region thereof.

However, the smoothed vote value is not limited thereto. Use may be made of various values calculated from a positional relationship or vote values of points in a neighborhood, such as the sum of the products of the points in the above set and proper weights or the maximum vote value in the neighborhood.

Next, the Hough space voting means 1131 will be supplementarily described. Although the Hough space voting means 1131 votes, in the Hough space, weights corresponding to the edge points detected by the edge point detection means 1120, with respect to respective points on loci that correspond to the edge points, it is also possible to perform voting not only to the respective points on the loci, but to neighboring ranges of the respective points on the loci determined by noise components considered to be included at the positions of the edge points. In this example, at the time of the voting, only those noise components caused by the coordinate discretization are considered as the noise components included at the positions of the edge points. In this case, it is considered that a true position of an edge point detected at a certain pixel position $(x_j, y_j)^T$ in the road image is located in a range of the following formula (13).

$$\left\{(x, y) \;\middle|\; x_j - \frac{1}{2} < x < x_j + \frac{1}{2},\; y_j - \frac{1}{2} < y < y_j + \frac{1}{2}\right\} \qquad (13)$$

Herein, as shown in FIG. 8, a weight corresponding to an edge point 702 is voted not only to a locus 705 in the Hough space corresponding to the edge point 702, but to a set 706 of loci in the Hough space corresponding to all points in a true position range 703 of the edge point expressed by the above formula (13). This makes it possible to suppress the influence of noise components caused by the coordinate discretization.

Next, the operation of this example will be described in detail with reference to FIG. 12 and a flowchart of FIG. 13.

Figure 13:
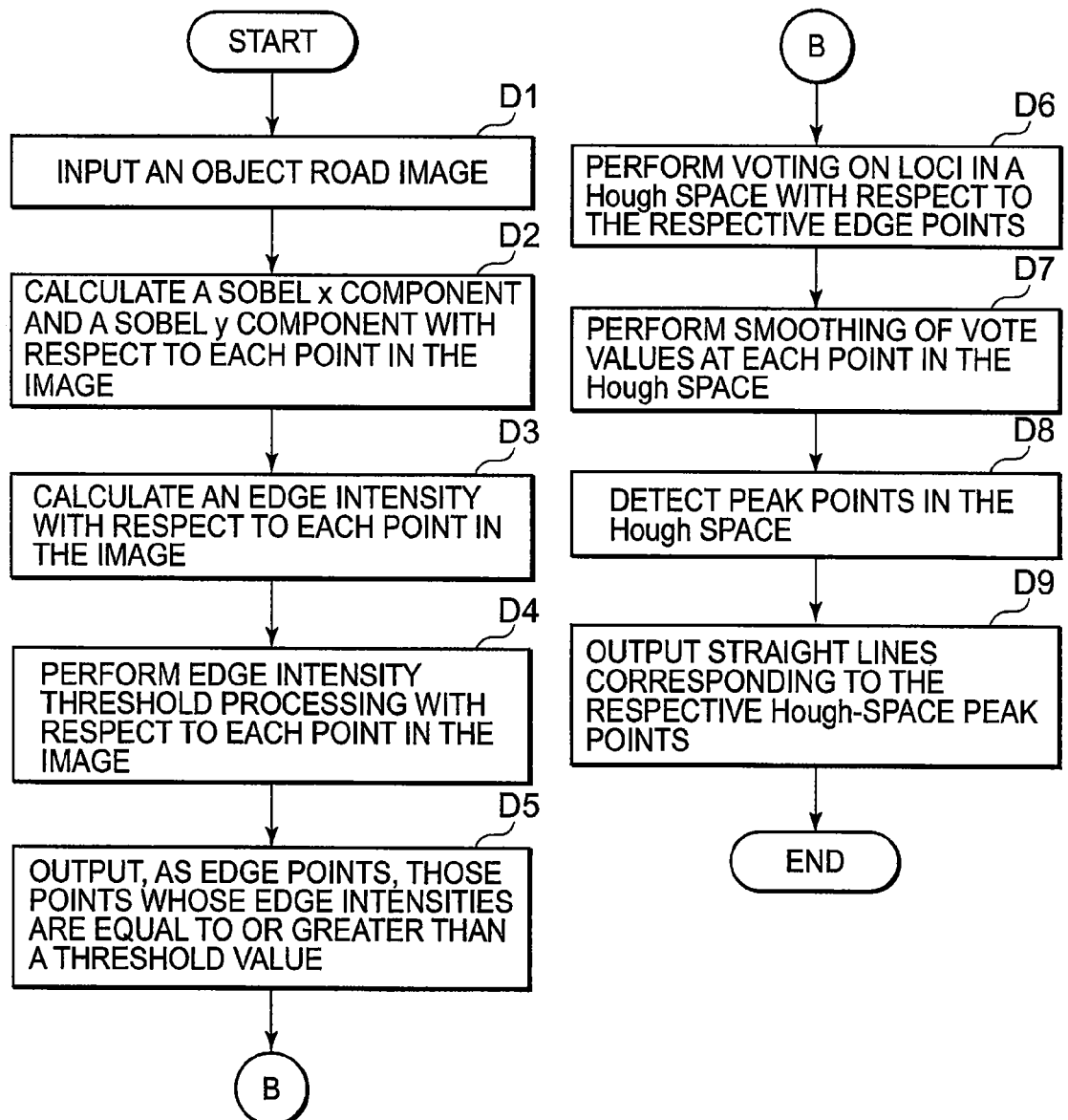
FIG. 13 is a diagram showing a specific example of the operation of the recognition system according to the second embodiment.

At first, the road image is input by the image input device 1110 (step D1 in FIG. 13). Then, the Sobel filter means 1121 calculates a Sobel x component and a Sobel y component with respect to each point in the road image (step D2). Further, the edge intensity calculation means 1122 calculates an edge intensity with respect to each point in the road image (step D3). Further, the edge intensity threshold processing means 1123 performs the edge intensity threshold processing with respect to each point in the road image (step D4). Further, the edge point output means 1124 outputs, as edge points, those points whose edge intensities are equal to or greater than the threshold value (step D5). Further, the Hough space voting means 1131 performs voting to loci in the Hough space with respect to the respective edge points (step D6). Further, the Hough space smoothing means 1132 performs smoothing of the vote values at each point in the Hough space (step D7). Further, the Hough space peak detection means 1133 detects peak points in the Hough space (step D8). Finally, the straight line output means 1140 outputs straight lines corresponding to the respective Hough-space peak points (step D9).

In this example, the object data is an image. However, the object data is not limited thereto, but may be any data as long as coordinate positions and data values at the respective positions are mapped to each other therein, such as, for example, a distance image in which a pixel value represents a distance to a corresponding actual object, a three-dimensional image in which pixel values are given at respective positions in a three-dimensional space, or a time-series image obtained by arranging, in a time-series direction, the above images or the above three-dimensional images obtained at different times.

Further, in this example, the inter-straight-line distance is defined as the sum of the squares of differences between x-coordinates on the respective horizontal lines in the attention region A311. However, it may be the sum of the squares of distances between positions on respective lines of a set of mutually parallel lines such as vertical lines, not limited to the horizontal lines.

Further, in this example, the inter-straight-line distance is defined as the sum of the squares of distances between positions on respective lines of a set of mutually parallel lines. However, it is not limited to the sum of the squares, but may be a quantity defined as a distance between vectors corresponding to two straight lines when a set of positions of each straight line on the respective lines of the set of mutually parallel lines is regarded as one vector, such as the sum of the absolute values or the maximum value of the absolute values.

INDUSTRIAL APPLICABILITY

This invention is applicable to a use such as detection of specific patterns in object data such as an image.

The invention claimed is:

1. A recognition system comprising Hough space voting means for performing voting, per feature point, on a corresponding locus in a parameter space and Hough space peak detection means for detecting peaks in said parameter space applied with said voting, thereby detecting specific patterns from an object image by Hough transform, said recognition system characterized in that said parameter space is designed by converting parameter expression of said specific patterns so that first and second magnitude relations are equivalent to or approximately equivalent to each other when said first magnitude relation is a magnitude relation of a distance between points in said parameter space subjected to voting and when said second magnitude relation is a magnitude relation of an inter-specific-pattern distance that is a predetermined amount indicative of a difference between two specific patterns of said specific patterns that is an amount related to a partial region in an image enclosed between said two specific patterns.

2. A recognition system according to claim 1, characterized in that said specific patterns are straight lines.

3. A recognition system according to claim 2, characterized in that said inter-specific-pattern distance is the sum of the squares of distances between positions of said specific patterns on respective horizontal lines, respective vertical lines, or respective lines of a horizontal-line group in a predetermined attention region in said object image.

4. A recognition system according to claim 3, characterized in that said straight lines are each expressed using, as parameters, an intercept and a coefficient of a slope on a certain horizontal line in said attention region.

5. A recognition system according to claim 2, characterized in that a weight corresponding to a quantization error of the object image is voted to one or more voting portions in a one-time voting process by said Hough space voting means.

6. A recognition system according to claim 3, characterized in that said image is a road image photographed by an on-vehicle device, said attention region is a region corresponding to a road surface image in said road image, and a running lane boundary such as a white line or a road end is detected by detecting said straight line.

7. A recognition method carried out by a processor, comprising a voting step of performing voting, per feature point, on a corresponding locus in a parameter space and a peak detection step of detecting peaks in said parameter space applied with said voting, thereby detecting specific patterns from an object image by Hough transform, said recognition method characterized in that said parameter space is designed by converting parameter expression of said specific patterns so that first and second magnitude relations are equivalent to or approximately equivalent to each other when said first magnitude relation is a magnitude relation of a distance between points in said parameter space subjected to voting and when said second magnitude relation is a magnitude relation of an inter-specific-pattern distance that is a predetermined amount indicative of a difference between two specific patterns of said specific patterns and that is an amount related to a partial region in an image enclosed between said two specific patterns.

8. A recognition method according to claim 7, characterized in that said specific patterns are straight lines.

9. A recognition method according to claim 8, characterized in that said inter-specific-pattern distance is the sum of the squares of distances between positions of said specific patterns on respective horizontal lines, respective vertical lines, or respective lines of a horizontal-line group in a predetermined attention region in said object image.

10. A recognition method according to claim 9, characterized in that said straight lines are each expressed using, as parameters, an intercept and a coefficient of a slope on a certain horizontal line in said attention region.

11. A recognition method according to claim 8, characterized in that said voting step comprises a step of voting a weight corresponding to a quantization error of the object image to one or more voting portions in a one-time voting process.

12. A recognition method according to claim 9, characterized in that said image is a road image photographed by an on-vehicle device and said attention region is a region corresponding to a road surface image in said road image, and characterized by comprising a step of detecting a running lane boundary such as a white line or a road end by detecting said straight line.

13. A non-transitory computer readable medium that causes a computer to carry out a recognition program to execute a voting step of performing voting, per feature point, on a corresponding locus in a parameter space and a peak detection step of detecting peaks in said parameter space applied with said voting, thereby detecting specific patterns from object data by Hough transform, said recognition program characterized in that said parameter space is designed by converting parameter expression of said specific patterns so that first and second magnitude relations are equivalent to or approximately equivalent to each other when said first magnitude relation is a magnitude relation of a distance between points in said parameter space subjected to voting and when said second magnitude relation is a magnitude relation of an inter-specific-pattern distance that is a predetermined amount indicative of a difference between two specific patterns of said specific patterns and that is an amount related to a partial region in an image enclosed between said two specific patterns.

14. A non-transitory computer readable medium according to claim 13, characterized in that said specific patterns are straight lines.

15. A non-transitory computer readable medium according to claim 14, characterized in that said inter-specific-pattern distance is the sum of the squares of distances between positions of said specific patterns on respective horizontal lines, respective vertical lines, or respective lines of a horizontal-line group in a predetermined attention region in said object image.

16. A non-transitory computer readable medium according to claim 15, characterized in that said straight lines are each expressed using, as parameters, an intercept and a coefficient of a slope on a certain horizontal line in said attention region.

17. A non-transitory computer readable medium according to claim 14, characterized in that said voting step votes a weight corresponding to a quantization error of the object image to one or more voting portions in a one-time voting process.

18. A non-transitory computer readable medium according to claim 15, characterized in that said image is a road image photographed by an on-vehicle device and said attention region is a region corresponding to a road surface image in said road image, and characterized by causing the computer to execute a step of detecting a running lane boundary such as a white line or a road end by detecting said straight line.

* * * * *